Nov. 24, 1936.  M. POIRIER  2,062,233
VEHICLE WHEEL SUSPENSION
Filed Sept. 20, 1934  4 Sheets-Sheet 3
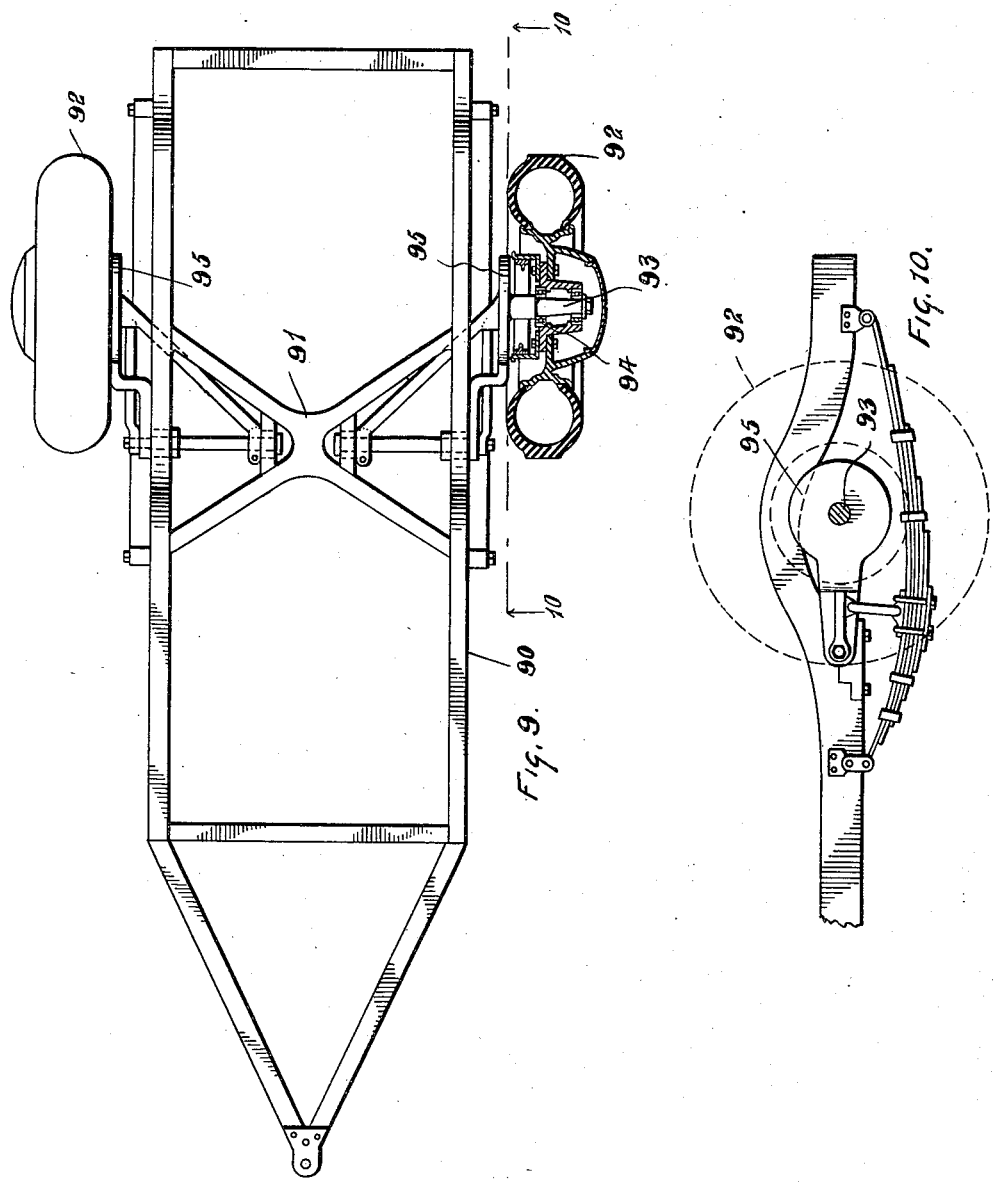
INVENTOR
MAURICE POIRIER
BY
ATTORNEY Nov. 24, 1936.  M. POIRIER  2,062,233
VEHICLE WHEEL SUSPENSION
Filed Sept. 20, 1934  4 Sheets-Sheet 4
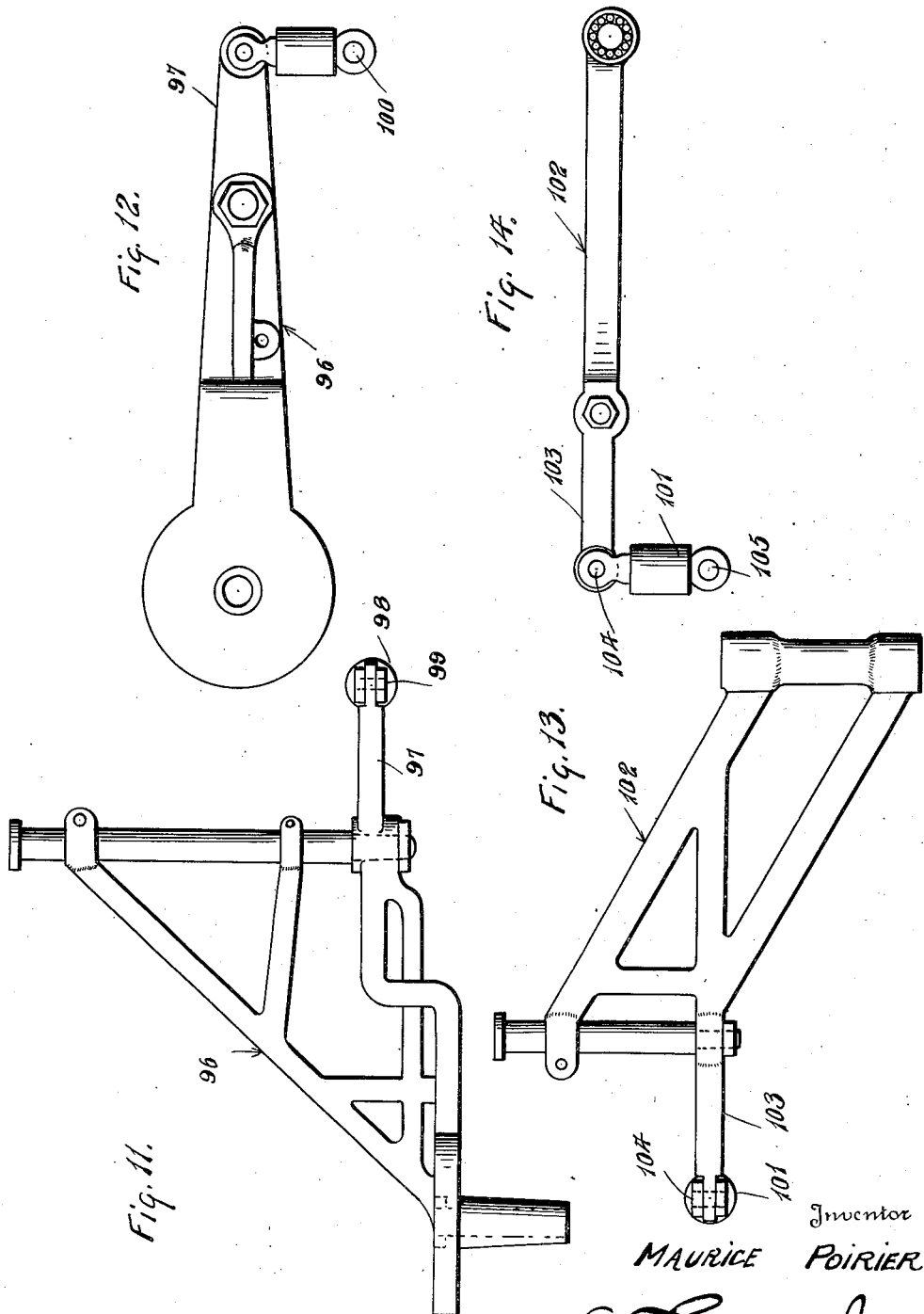
Inventor
MAURICE POIRIER.
By L. F. Randolph Jr.
Attorney Patented Nov. 24, 1936

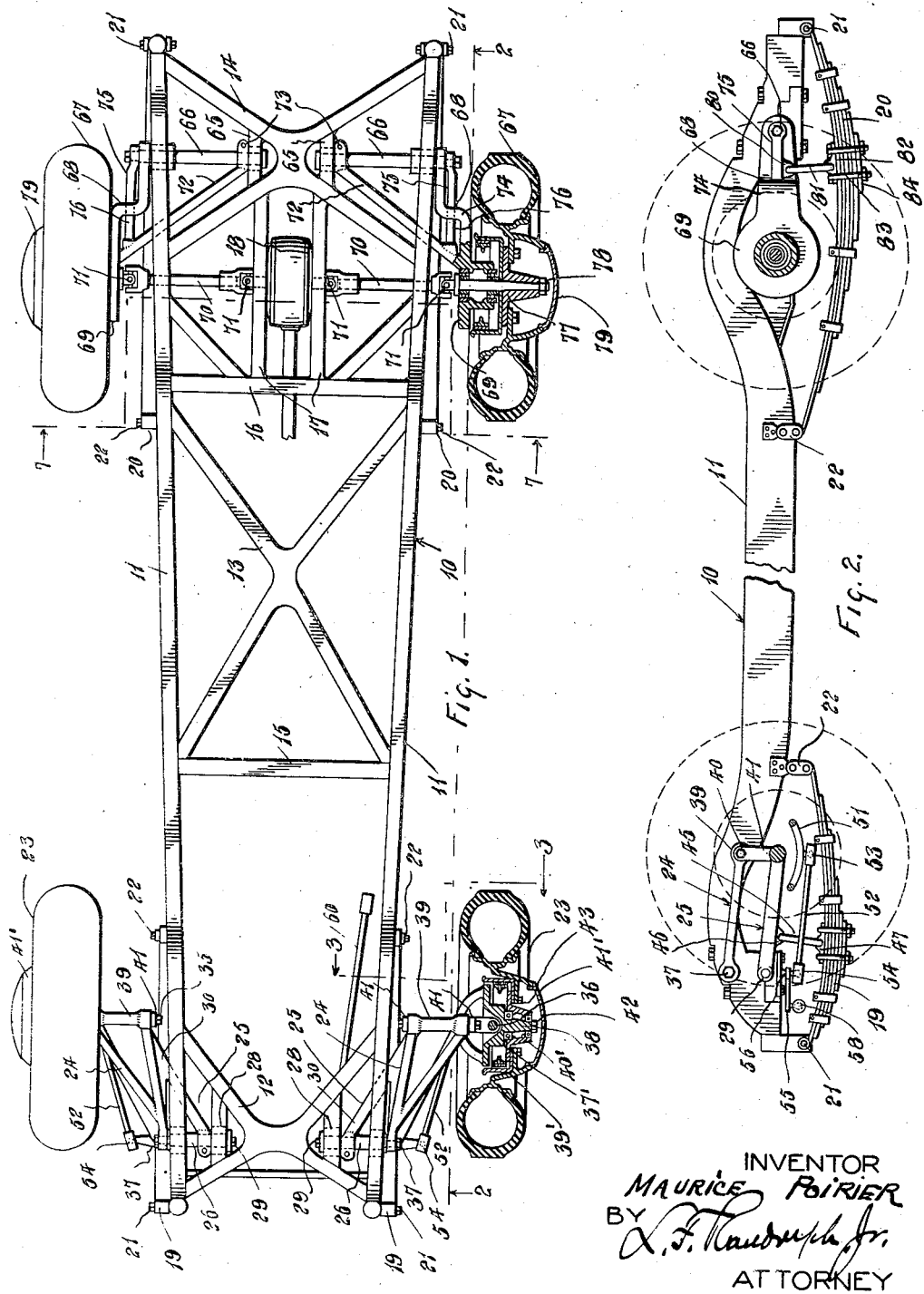

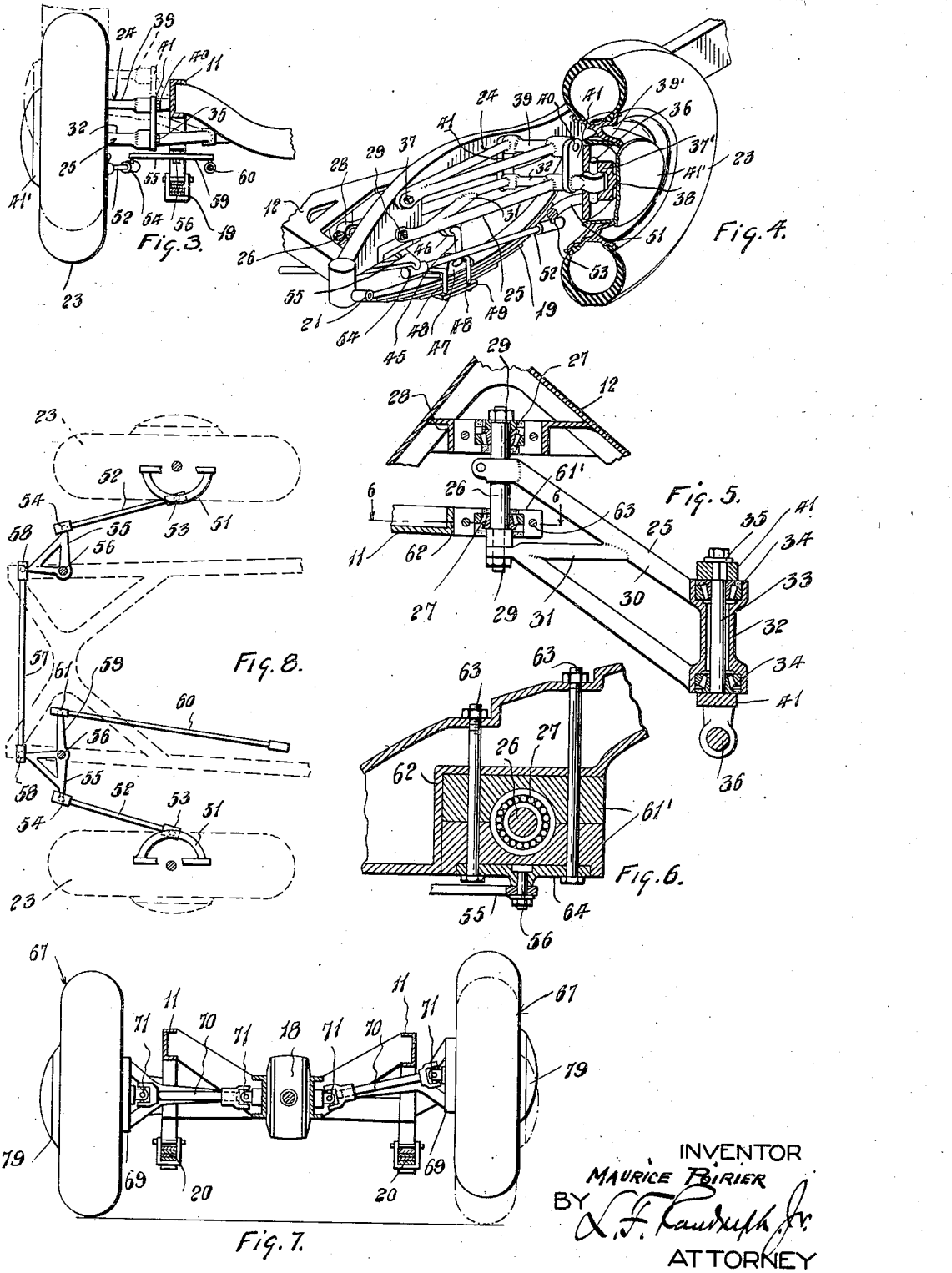

2,062,233

UNITED STATES PATENT OFFICE 2,062,233

VEHICLE WHEEL SUSPENSION

Maurice Poirier, Burbank, Calif., assignor of nineteen one-hundredths to William I. F. George, Burbank, Calif.

Application September 20, 1934, Serial No. 744,827

2 Claims. (Cl. 267—19)

This invention relates to improvements in vehicle wheel suspensions and in general aims to provide a novel construction providing independent wheel and spring action with a ratio between the individual wheels and the chassis frame.

A further object is to provide means independent of wheel bracket arms for maintaining the front and rear wheels, parallel to the chassis and to cause them to travel over bumps and undulations with a ratio of three to one, and means controlling such ratio by the lift of the wheels in order to eliminate to the minimum, the bouncing in driving and when the brakes of the vehicle are applied so as to reduce the unsprung weight and to avoid transmission thereof to any one part of the suspension.

It is further aimed to provide a novel construction of chassis or frame having X reinforcing beams, aiding in positively maintaining the wheels in alinement with the chassis and preventing undue strain on any one part of the vehicle, so that the unsprung weight is divided to five points for each wheel.

It is further aimed to provide a spring mounting utilizing semielliptic springs to support the chassis upon the wheels and effect an action at the ratio of one to three, which maintains the chassis frame level, and at the same time gives the necessary freedom of motion of the wheels described to respond to road shocks, on a basic ratio without disturbing the level of the chassis frame.

In addition, it is aimed to provide a novel construction of bracket arms and coacting bearings, to provide a more rigid construction, avoid undue wear, eliminate end play, and keep the wheels in alinement with the chassis frame.

Various additional objects and advantages will in part be pointed out hereinafter and otherwise become apparent from a consideration of the accompanying drawings illustrating an operative embodiment.

In said drawings:—

Figure 1 is a view primarily in plan and partly in section, showing my improvement applied in connection with an automobile chassis;

Figure 2 is a longitudinal sectional view taken on the line 2—2 of Figure 1;

Figure 3 is a detail view primarily in section taken on the line 3—3 of Figure 1;

Figure 4 is a fragmentary sectional view showing the construction adjacent one of the front wheels;

Figure 5 is a detail horizontal sectional view showing one of the mounting elements for one of the front wheels;

Figure 6 is a vertical sectional view taken on the plane of line 6—6 of Figure 5;

Figure 7 is a rear view primarily in section taken on the line 7—7 of Figure 1;

Figure 8 is a plan view illustrating the steering connections for the front wheels;

Figure 9 is a plan view showing the invention applied to a trailer;

Figure 10 is a vertical section taken on the plane of line 10—10 of Figure 9;

Figure 11 is a plan view of a modified form of bracket mounting for the rear wheels;

Figure 12 is an elevational view of the bracket of Figure 11;

Figure 13 is a plan view of a modified form of lower front wheel mounting; and

Figure 14 is an elevational view of the wheel mounting of Figure 13.

Referring specifically to the drawings and first to the form of the invention disclosed in Figures 1 to 8, a suitable, usually steel, chassis frame is provided as at 10 having side beams 11 slightly converging towards the front of the vehicle. Such beams are jointed and reinforced by X-shaped elements or spiders 12, 13 and 14, respectively being adjacent the front, center and rear of the chassis frame. The beams 11 are spanned by cross beams 15 and 16 adjacent the connections with the spider 13, and parallel beams 17 join the beams 16 and frame 14, to form a more efficient support and mounting for a conventional differential drive 18 for the automobile.

Semielliptical laminated springs are provided at the front of the chassis frame at 19 and at the rear of such frame at 20, being connected to the frame at one end by bolts as at 21, and at the other end by means of shackles 22. It will be noted that all of said springs 19 and 20 are in parallelism with the central longitudinal median line of the chassis frame.

The front wheels of the vehicle are designated 23 and are mounted for truly vertical movement, individually, and always from a horizontal axis, being adapted for steering in a novel manner. To this end, upper and lower mounting brackets are provided as at 24 and 25. The lower bracket is rigidly fastened to a stub shaft 26 journalled in suitable bearings 27 in the chassis frame 10, one of the latter being carried by struts 28 of the spider 12. The stub shaft 26 is removably secured in place by nuts 29. The lower bracket 25 has parallel arms or bars 30 fastened rigidly to the stub shaft, and connected together by a strut as at 31. At the rear end the arms 30 are joined by an axle housing 32 in which a rod 33 is removably journaled in suitable bearings 34, a nut 35, for instance, being used to secure the rod in place. Such rod at the outer end is equipped with a king pin 36. Disposed over each lower bracket 25 are the aforesaid upper brackets 24, which are of triangular shape and at their forward ends are pivoted removably by means of stub shafts 37 directly above the axes of the stub shafts 26. Said stub shafts 37 may be removable bolts engaged with the frame 10. At the rear end of the upper bracket 24, a tube 39 is provided in which a bolt or rod 40 is journaled, serving to pivotally connect vertical links 41 through which the rod 33 also passes, to connect the links to the lower bracket pivotally.

Said king pins 36 are journaled on vertical axes in hubs 37' carrying axles 38 on which the frames of the wheels 23, designated 39', are journaled, with bearings as at 40' interposed. The wheels 23 have removable hub caps as at 41', which expose nuts 42 used to secure the wheels to the hubs 37', and nuts 43 which detachably secure sections of the wheel together so that they may be dismounted. Substantially vertical links 45 are pivoted at their upper ends in bosses 46 of the lower brackets 25 and also pivoted in blocks 47 secured in place for instance by U-bolts 48 and plates 49, used to secure the laminations of the springs 19 together. The center support of the semi-elliptic springs is disposed one-third of the spring length from the forward end of the same.

In order to steer the said front wheels, each hub 37' has an arcuate projection 51 thereon. Drag links 52 are pivoted on vertical axes 53 to the projections 51 and at 54 are pivoted on vertical axes to bell crank levers 55 pivoted as at 56 to the side beams 11. In turn, a rod 57 connects said bell crank levers, being pivoted thereto on vertical axes at 58. One of the bell crank levers 55 has an extension 59 with which a rod 60 is pivotally connected on a vertical axis as at 61, and which is connected at the rear, in any suitable way, to steering apparatus of the vehicle. The various pivotal connections as at 53, 54, 58 and 61 may be ball and socket joints or otherwise as preferred.

Reverting to Figures 5 and 6 the stub shafts 26 and their bearings 27, may be removably mounted between blocks as at 61', disposed in cut away portions 62 of the side beams 11 and held in place as by means of bolts 63 passing through said blocks and said side beams. Said bolts also pass through brackets 64, which mount the pivots 56 which are in the form of bolts.

It will be noted that the rear spider 14 has struts at 65. Journaled in suitable bearings in the beams 11 and said struts 65 are stub cross shafts 66 constituting parts for the mounting of rear wheels 67. Brackets 68 are rigidly connected to the stub shafts 66, such brackets including hubs 69 through which the rear axle 70 passes and which rear axle 70 at various locations has universal joints 71 therein to enable the axle to displace as suggested in Figure 7, to accord with the individual vertical movement or yielding of the rear wheels 67. From the hubs 69 diagonal bars 71 extend to the stub shafts 66, being clamped thereto as at 73. Also extending from said hubs 69 are rearwardly extending arms 74 and 75, rigidly secured to stub shafts 66, the arms 74 preferably having an offset portion 76 as shown, to afford greater strength. The wheel 67, by means of its body 77, is detachably mounted on the rear axle 70 as by means of a nut 78, accessible when a hub cap 79 is removed.

Said offset portion 76 has a boss 80 thereon, pivotally mounting a link 81, which at its lower end is pivotally mounted in a block 82, fastened in place by U-bolts 83 and a plate 84, which primarily serve to secure the laminations of the springs 20 together.

It will be seen that the bracket and stud shaft 66 of each rear wheel, swing as a unit from the axes of such stub shafts, and that the rear wheels move therewith, controlled by the link 81, and the springs 20.

It will be noted that the side beams 11 are upwardly arched adjacent each of the wheels, in order to afford clearance for effective operation of the adjacent parts.

Referring now to Figures 9 and 10, the novel suspension is shown as applied to a trailer. 90 designates the body thereof which has only one X-shaped part or spider at 91. The wheels 92 are mounted and suspended identically like the rear wheels 67, with the exception that there is no transmission and such wheels are freely journaled on stub axles 93, with bearings 94 interposed. Such stub axles 93 extend from hubs or plates 95, being a modification of those at 69.

Referring now to Figures 11 and 12, a modified form of the mounting bracket for the rear wheels, here designated 96, has a longitudinal extension at 97 which may be connected with a dash pot or hydraulic means 98 by a pivot at 99 and which dash pot or hydraulic means in turn, at 100, is adapted to be pivoted to the frame 10. Such dash pot or hydraulic means 98 is of any suitable regulatable type which is adjustable to control the flow of fluid between the parts thereof to accordingly control the action of bracket 96.

A dash pot or hydraulic means 101 may be used in connection with the lower bracket which mounts the front wheels and which bracket is shown generally at 102. This bracket has an arm or extension 103 pivotally connected at 104 to the said dash pot or hydraulic means 101, and which in turn is pivoted as at 105, to the chassis 10. The dash pot 101 is identical with that at 98.

It will be observed that I have provided an individual wheel suspension for the front and rear wheels of an automotive or other vehicle, by means of which the wheels are firmly assembled on the chassis frame with generally triangular-shaped bracket arms, which rigidly maintain in perfect alinement the wheels with the chassis frame, and at the same time, both the longitudinal and vertical components of road shock imported to the wheels are obsorbed by the five point suspension wheel mechanism.

Various changes may be resorted to provided they fall within the spirit and scope of the invention.

I claim as my invention:—

1. A wheel mounting in combination with a chassis, horizontal brackets pivoted to said chassis in a vertical line one above the other, a suspension spring for the chassis, a link pivoted to said spring intermediate its ends and to one of said brackets, an axle mounted on one of said brackets rearwardly of its pivot, a wheel mounted on said axle, a rod on the other bracket in vertical line with said axle, and link means pivoted to said rod and to said axle.

2. A wheel mounting in combination with a chass comprising a beam, a bracket having parallel arms disposed diagonally and at their forward ends being on opposite sides of said beam, a stud shaft pivoting said arms to said beam, a bracket above the first-mentioned bracket pivoted to said beam in vertical line with the fulcrum of the first-mentioned bracket, said brackets having transverse tubular portions arranged one above the other, an axle in the lowermost tubular portion, a rod in the uppermost tubular portion, link means pivoted to said axle and to said rod, a wheel mounted by said axle, a suspension spring for said beam, and a link pivoted to said suspension spring intermediate the ends of the latter and to the lowermost bracket intermediate the ends thereof.

MAURICE POIRIER.